(12) United States Patent
Bleich et al.

(10) Patent No.: US 10,478,708 B2
(45) Date of Patent: Nov. 19, 2019

(54) COORDINATING MUSCULOSKELETAL AND CARDIOVASCULAR HEMODYNAMICS

(71) Applicant: Pulson, Inc., Palo Alto, CA (US)

(72) Inventors: Jeffery Lee Bleich, Palo Alto, CA (US); Paul David Mannheimer, Palo Alto, CA (US)

(73) Assignee: Pulson, Inc., Palo Alto, CA (US)

( * ) Notice: Subject to any disclaimer, the term of this patent is extended or adjusted under 35 U.S.C. 154(b) by 296 days.

(21) Appl. No.: 15/515,118

(22) PCT Filed: Sep. 25, 2015

(86) PCT No.: PCT/US2015/052326
§ 371 (c)(1),
(2) Date: Mar. 28, 2017

(87) PCT Pub. No.: WO2016/053793
PCT Pub. Date: Apr. 7, 2016

(65) Prior Publication Data
US 2017/0216706 A1  Aug. 3, 2017

Related U.S. Application Data

(60) Provisional application No. 62/056,730, filed on Sep. 29, 2014.

(51) Int. Cl.
*A63B 71/06* (2006.01)
*G09B 23/28* (2006.01)
(Continued)

(52) U.S. Cl.
CPC .......... *A63B 71/0686* (2013.01); *A63B 21/06* (2013.01); *A63B 22/0023* (2013.01);
(Continued)

(58) Field of Classification Search
CPC . A63B 71/0686; A63B 22/0664; A63B 21/06; A63B 22/0076; A63B 22/0023;
(Continued)

(56) References Cited

U.S. PATENT DOCUMENTS 2,690,174 A  3/1949  Fuchs
3,303,841 A  2/1967  Dennis
(Continued)

FOREIGN PATENT DOCUMENTS

EP  2744403  6/2014
EP  2967401  1/2016
(Continued)

OTHER PUBLICATIONS

U.S. Appl. No. 13/589,073 (now U.S. Pat. No. 8,961,185), filed Aug. 17, 2012, System and Method for Reliably Coordinating Musculoskeletal and Cardiovascular Hemodynamics.
(Continued)

*Primary Examiner* — Sundhara M Ganesan
(74) *Attorney, Agent, or Firm* — Aurora Consulting LLC; Ashley Sloat (57) ABSTRACT

The present invention is generally directed to methods, systems, and computer program products for coordinating musculoskeletal and cardiovascular hemodynamics, and more directly to stationary and non-stationary exercise equipment that include adjustable behaviors and are used with repetitive activities. The equipment is adjusted automatically in real-time to alter the work output, cadence, and/or timing of the user's physical activity in response to their monitored cardiovascular and musculoskeletal signals to achieve and maintain a targeted coordination of their heart and musculoskeletal pump cycle timing.

20 Claims, 6 Drawing Sheets

(51) Int. Cl.

| | |
|---|---|
| A63B 21/06 | (2006.01) |
| A63B 22/00 | (2006.01) |
| A63B 22/02 | (2006.01) |
| A63B 22/04 | (2006.01) |
| A63B 22/06 | (2006.01) |
| A63B 24/00 | (2006.01) |
| G09B 19/00 | (2006.01) |

(52) U.S. Cl.
CPC ...... *A63B 22/0076* (2013.01); *A63B 22/0235* (2013.01); *A63B 22/04* (2013.01); *A63B 22/0605* (2013.01); *A63B 22/0664* (2013.01); *A63B 24/0062* (2013.01); *A63B 24/0075* (2013.01); *A63B 24/0087* (2013.01); *A63B 71/0622* (2013.01); *G09B 19/00* (2013.01); *G09B 23/288* (2013.01); *A63B 2024/0093* (2013.01); *A63B 2071/0625* (2013.01); *A63B 2071/0655* (2013.01); *A63B 2220/40* (2013.01); *A63B 2220/62* (2013.01); *A63B 2220/806* (2013.01); *A63B 2220/808* (2013.01); *A63B 2220/833* (2013.01); *A63B 2220/836* (2013.01); *A63B 2225/50* (2013.01); *A63B 2230/062* (2013.01); *A63B 2230/085* (2013.01); *A63B 2230/305* (2013.01); *A63B 2230/405* (2013.01); *A63B 2230/605* (2013.01)

(58) Field of Classification Search
CPC ............ A63B 22/0235; A63B 71/0622; A63B 22/0605; A63B 22/04; A63B 24/0087; A63B 24/0075; A63B 24/0062; A63B 2220/833; A63B 2230/305; A63B 2220/808; A63B 2220/836; A63B 2230/062; A63B 2230/605; A63B 2225/50; A63B 2220/62; A63B 2230/405; A63B 2024/0093; A63B 2071/0625; A63B 2071/0655; A63B 2230/085; A63B 2220/806; A63B 2220/40; G09B 19/00; G09B 23/288
See application file for complete search history.

(56) References Cited

U.S. PATENT DOCUMENTS

| | | | |
|---|---|---|---|
| 4,253,254 A | 3/1981 | Gill | |
| 4,541,417 A | 9/1985 | Krikorian | |
| 4,867,442 A | 9/1989 | Matthews | |
| 5,137,501 A | 8/1992 | Mertsesdorf | |
| 5,156,147 A | 10/1992 | Warren | |
| 5,423,869 A | 6/1995 | Poore | |
| 5,462,504 A | 10/1995 | Trulaske | |
| 5,571,075 A | 11/1996 | Bullard | |
| 5,697,884 A | 12/1997 | Francischelli | |
| 6,132,337 A | 10/2000 | Krupka | |
| 6,155,976 A | 12/2000 | Sackner | |
| 6,261,236 B1 | 7/2001 | Grimblatov | |
| 6,261,250 B1 | 7/2001 | Phillips | |
| 6,537,229 B1 | 3/2003 | Wang | |
| 6,556,866 B2 | 4/2003 | Dal Molin | |
| 6,605,046 B1 | 8/2003 | Del Mar | |
| 7,643,873 B2 | 1/2010 | Chan | |
| 7,846,104 B2 | 12/2010 | Macquarrie et al. | |
| 7,908,013 B2 | 3/2011 | Miesel | |
| 8,961,185 B2 | 2/2015 | Bleich et al. | |
| 9,457,190 B2 | 10/2016 | Bleich et al. | |
| 9,522,317 B2 | 12/2016 | Bleich et al. | |
| 2004/0072133 A1 | 4/2004 | Kullok | |
| 2004/0077954 A1 | 4/2004 | Oakley | |
| 2005/0288720 A1 | 12/2005 | Ross | |
| 2007/0219059 A1 | 9/2007 | Schwartz et al. | |
| 2008/0165017 A1 | 7/2008 | Schwartz | |
| 2008/0236369 A1 | 10/2008 | Sasaki | |
| 2009/0036938 A1 | 2/2009 | Shipley | |
| 2009/0076341 A1 | 3/2009 | James et al. | |
| 2009/0287243 A1 | 11/2009 | Greennberg | |
| 2010/0189209 A1 | 7/2010 | O'Rouke | |
| 2013/0103108 A1 | 4/2013 | Koh et al. | |
| 2015/0080746 A1 | 3/2015 | Bleich et al. | |
| 2016/0148531 A1 | 5/2016 | Bleich et al. | |
| 2017/0014633 A1 | 1/2017 | Bleich et al. | |
| 2017/0095721 A1 | 4/2017 | Bleich et al. | |

FOREIGN PATENT DOCUMENTS

| | | |
|---|---|---|
| WO | WO2013028581 | 2/2013 |
| WO | WO2014145863 | 9/2014 |
| WO | WO2016053793 | 4/2016 |
| WO | WO2016085768 | 6/2016 |

OTHER PUBLICATIONS

U.S. Appl. No. 14/553,732 (now U.S. Pat. No. 9,522,317), filed Nov. 25, 2014, Systems and Methods for Coordinating Musculoskeletal and Cardiovascular or Cerebrovascular Hemodynamics.

U.S. Appl. No. 15/384,268, filed Dec. 19, 2016, Systems and Methods for Coordinating Musculoskeletal and Cardiovascular or Cerebrovascular Hemodynamics.

U.S. Appl. No. 15/650,130, filed Jul. 14, 2017, Systems and Methods for Coordinating Musculoskeletal and Cardiovascular or Cerebrovascular Hemodynamics.

U.S. Appl. No. 14/216,960 (now U.S. Pat. No. 9,457,190), filed Mar. 17, 2014, Coordinating Musculoskeletal and Cardiovascular Hemodynamics.

U.S. Appl. No. 15/278,617, filed Sep. 28, 2016, Coordinating Musculoskeletal and Cardiovascular Hemodynamics.

U.S. Appl. No. 14/553,725, filed Nov. 25, 2014, Systems and Methods for Coordinating Musculoskeletal and Cardiovascular or Cerebrovascular or Hemodynamics.

International Preliminary Report on Patentability and Written Opinion, received in PCT/US2012/051511, dated Feb. 25, 2014.

International Preliminary Report on Patentability and Written Opinion, received in PCT/US2014/030699, dated Sep. 15, 2015.

Coleman, W., "On the Correlation of the Rate of Beat, Breathing, Bodily Movement Sensory Stimuli", J. Physiol, vol. 54, No. 4, pp. 213-217, Dec. 7, 1920.

Coleman, W., "The Psychological Significance of Bodily Rhythms", The Journal of Comparative Physiology, vol. 1, pp. 213-220, 1921.

Heagerty, A., "Winning rhythm?", The Lancet, vol. 343, pp. 310, Feb. 5, 1994.

Kirby, et al., "Coupling of Cardiac and Locomotor Rhythms", American Physiological Society, 0161-7567/89, pp. 323-329, 1989.

McDonald, D., "Regional Pulse-Wave Velocity in the Arterial Tree", J. Applied Physiology, vol. 24, No. 1, pp. 73-78. 1968.

Murry et al., "Preconditioning with Ischemia: a delay of lethal cell injury in ischemic myocardium", Circulation, vol. 74, No. 5, pp. 1124-1136, 1986.

T. Nakazumi et al., Entrainment of the heart beat into the running pitch during endurance running [I], Japanese J Phys Fitness and Sports Med 1986, vol. 36 No. 6, p. 340.

Nichols et al., "McDonald's Blood Flow in Arteries", Chapter 25 "Exercise", pp. 452-498, Hodder Arnold Publishers, Apr. 28, 2005.

Niizeki et al., "Phase-Dependent Heartbeat Modulation by Muscle Contractions During Dynamic Handgrip in Humans", American Physiolofical Society, 0363-6135/99, pp. H1331-H1338, 1999.

Niizeki K., "Intramuscular pressure-induced inhibition of cardiac contraction: implications for cardiac locomotor synchronization", Am J Physiol Regul Integr Comp Physiol 288: R645-R650, 2005 (First published Nov. 4, 2004; doi:10.1152/ajpregu.00491, 2004).

Nomura, et al., "Analysis entrainment of cardia and locomotor rhythms in humans using the surrogate data technique", European Journal of Applied Physiology, vol. 84, No. 5, pp. 373-378, 2001.

Nomura, et al., "Phase-dependent chronotropic response of the heart during running in humans", Eur J Appl Physiol vol. 97, pp. 240-247, 2006.

(56) References Cited

OTHER PUBLICATIONS

O'Rourke et al., "Improved cardiovascular performance with optimal entrainment between heart rate and step rate during running in human," Coronary Artery Disease vol. 3, pp. 863-869, 1992.
O'Rourke et al., "The rhythm of running: can the heart join in?", Aust NZ J Med, vol. 23, pp. 708-710, 1993.
Palatini et al., "Blood pressure changes during running in humans: the 'beat' phenomenon", American Physiological Society, 0161-7567, 1989.
M. Udo, et al. Entrainment of the heart beat into the running pitch during endurance running [II], Japanese J Phys Fitness and Sports Med 1986, vol. 36, No. 6, p. 341.
D. Zhang, An experimental and modeling study of the relationship between step rate and heart rate during running exercise, Doctorate Thesis, University of New South Wales, Sidney, Australia, 2002.
Zhang et al., "Possible mechanism for modulating cardiovascular system during running in humans", 23rd Annual International Conference of the IEEE Engineering in Medicine and Biology Society, Oct. 25-26, 2001.
Zhang et al., "Monitoring Physiological Signals during Running Exercise", 23rd Annual International Conference of the IEEE Engineering in Medicine and Biology Society, Oct. 25-26, 2001.
D. Zhang et al., "The effect of heartbeat-synchronised running on the cardiovascular system," Conference Proceedings, 2nd Joint EMBS-BMES Conference 2002, 24th Annual International Conference of the Engineering in Medical and Biology Society, Annual Fall meeting of the Biomedical Engineering Society, IEEE, vol. 2, 2002, pp. 1295-1296.
Zhao et al., "Inhibition of myocardial injury by ischemic postconditioning during reperfusion: comparison with ischemic preconditioning", Am J Physiol Heart Circ Physiol 285: H579-H588, 2003 (first published Apr. 3, 2003; 10,1152/ajpheart.01069, 2002).
International Search Report and Written Opinion received in PCT/US2015/052326, dated Dec. 23, 2015.
International Search Report and Written Opinion received in PCT/US2015/061696, dated Feb. 2, 2016.
First Exam Report (EPO Form 2906) issued in Application No. 12 754 154.8 dated Jun. 26, 2015.
Extended European Search Report received in EP 14763849.8, dated Nov. 23, 2016.

FIG. 1

(Dashed boxes indicate examples of alternative sensors, though is not intended to be limiting)

COORDINATING MUSCULOSKELETAL AND CARDIOVASCULAR HEMODYNAMICS

CROSS-REFERENCE TO RELATED APPLICATIONS

This application is the National Stage of International Patent Application No. PCT/US2015/052326, entitled "Coordinating Musculoskeletal and Cardiovascular Hemodynamics" and filed Sep. 25, 2015, which claims priority to U.S. Provisional Application No. 62/056,730 filed Sep. 29, 2014, the contents of which are herein incorporated by reference in their entirety.

COPYRIGHT NOTICE

Portions of this disclosure contain material in which copyright is claimed by the applicant. The applicant has no objection to the copying of this material in the course of making copies of the application file or any patents that may issue on the application, but all other rights whatsoever in the copyrighted material are reserved.

BACKGROUND

1. Field of the Invention

This invention relates generally to the field of human physiology, and, more particularly, to methods, apparatus, systems, software and computer program products for coordinating musculoskeletal and cardiovascular hemodynamics during rhythmic physical activity.

2. Related Art

Blood is circulated through the body by the heart during its pumping cycle, which consists of two distinct periods systole and diastole. Heart muscle (myocardium) contracts to eject blood from the ventricles during the systolic period of each cardiac cycle. This ejection of blood generates arterial blood pressure and flow adequate to deliver blood to tissues throughout the body, thereby transporting oxygen, nutrients and metabolic products, removing carbon dioxide and waste, and facilitating critical physiological functions such as heat exchange. Unlike the rest of the body, which receives most of its arterial blood flow as a result of pressure generated during systole, the heart's own arterial blood supply is delivered primarily during the diastolic portion of the cycle when the heart muscle is relaxing and the heart chambers are filling with venous blood for the next contraction. During this diastolic period, residual blood pressure in the aorta drives blood flow through the coronary arteries and into the myocardial muscle, supplying the heart with its needed oxygen and nutrients.

During physical activity, the musculoskeletal (MSK) system also plays an important role in circulating blood throughout the body. During rhythmic physical activities, two factors commonly cause regular oscillations in peripheral arterial and venous blood pressure and flow: skeletal muscle contraction and relaxation cycles that intermittently compress arterial and venous vasculature, and inertial changes from physical movements that redistribute the person's intravascular blood volume.

When skeletal muscle contractions or MSK movements are favorably coordinated with the heart's pump cycle, the two pumping systems can augment one another, thereby increasing blood flow and perfusion to, through, and from important areas of the body, with less pumping energy expended by the heart. This favorable coordination of the two pumping systems can be referred to as "musculoskeletal counterpulsation" (MCP). During periods of sustained MCP, maximum rhythmic MSK-induced blood pumping consistently increases blood flow into the central circulation while the heart is relaxing and refilling between contractions, and maximum cardiac-induced pumping consistently increases blood flow during maximal MSK relaxation. On the other hand, when rhythmic muscle contractions and MSK movements occur with uncoordinated, or worse, unfavorably coordinated timing, the efficiency and effectiveness of blood pumping is decreased. Unfavorable coordination occurs, for example, when the cardiac pump cycle (CC) and MSK activity cycle (MSKC) consistently pump blood—from opposing directions—maximally into the central circulation at substantially the same time during rhythmic physical activity. This unfavorable coordination of the two pumping systems can be referred to as "inverse musculoskeletal counterpulsation" (iMCP).

Typically, when individuals walk, run, bicycle, or participate in any rhythmic physical activity, most experience only intermittent favorable coordination between MSKC blood pumping and CC blood pumping. Even when an individual's heart rate (HR) and exercise cadence happen to be equal, the respective timing of the two pumps may be favorably coordinated, unfavorably coordinated, or somewhere in between. Research has shown that a certain degree of "cardio-locomotor synchronization" can naturally occur during rhythmic physical activity. However, when such synchrony does occur, it is usually only a temporary phenomenon.

The benefits of a favorable coordination between an individual's MSKC and their CC timing can include improved perfusion and oxygenation of cardiac and peripheral skeletal muscle and possibly other tissues; increased cardiac preload and stroke volume; a lower heart rate (HR); a decrease in systolic blood pressure and pulse pressure; a decrease in required respiratory effort; and less muscle fatigue due to improved skeletal muscle perfusion. All of these benefits can combine to result in physiological advantages that may include decreased myocardial stress, increased aerobic energy production capabilities, improved potential for aerobic fat metabolism, preservation of muscle glycogen stores, enhanced individual performance, and a potential increase in the health benefits and safety of rhythmic physical activity. Conversely, lack of coordination or unfavorable coordination between MSKC and the heart's pump cycle can drive physiology in the opposite direction.

Prior U.S. patent application Ser. No. 13/589,073 (pub. No. US 2013/0171599) and Ser. No. 14/216,960, both assigned to Pulson, Inc., the assignee of the present disclosure, describe several systems and methods that can enable a user to favorably coordinate their MSKC and CC timing. One of the general approaches described in these prior applications provides adaptive real-time biofeedback prompts to a user while engaged in a repetitive physical activity, requiring the user to voluntarily and consistently coordinate their activity timing according to the provided prompts. While most users are able to easily utilize this approach, some might find the prompts difficult to follow or have difficulty maintaining the needed focus in the presence of distractions. In addition, some users may prefer a more automatic approach that requires less of their attention. Accordingly, there is a need to enable MCP during rhythmic physical activities by means that do not require the persistent attention of the user.

BRIEF DESCRIPTION OF THE DRAWINGS

For a better understanding of the present invention, and to show more clearly how it functions, reference will now be made, by way of example, to the accompanying drawings. The drawings show embodiments of the present invention in which.

DETAILED DESCRIPTION

The systems and methods described below are directed generally to controlling automatically and in real-time the settings or behaviors of stationary and non-stationary exercise equipment (equivalently, apparatus) based on the user's sensed relative MSKC and CC timing. This allows users to attain and maintain a targeted relative MSKC-CC timing relationship without requiring them to consciously respond to specific timing prompts.

The systems include sensors that are responsive to a user's CC and MSKC, associated circuitry to provide respective signals to a microprocessor, exercise equipment that includes adjustable settings or behaviors, and interface circuitry between the microprocessor and componentry of the exercise equipment that causes changes to the settings or behaviors.

Any type of equipment or other mechanical device used in conjunction with a generally repetitive or rhythmic exercise can be used, including, for example, any form of treadmill, elliptical trainer, ski machine, bicycle (regular or stationary), rowing apparatus, stair-stepping machine, weight or resistance-based strength trainer or any other machine which a user uses in conjunction with a generally rhythmic physical exercise. Relevant adjustable settings of the equipment can include the speed, resistance, gearing, incline, stride length, or any other factor during the operation of the equipment that can affect a user's MSKC and/or CC timing.

Operating algorithms used by the microprocessor are configured as closed-loop control systems that (1) use signals from sensors responsive to MSKC and CC activity to determine the value of the user's relative MSKC vs. CC timing, (2) use this value in calculating a difference relative to a target timing relationship, and then (3) according to the difference, determine a value that is used by the interface to cause a change in one or more of the exercise equipment's settings or behaviors that affects the user's repetitive movements intrinsically. Accordingly, the timing of their movements is made to approach a targeted relationship with respect to their CC timing. In some embodiments, the user may not be consciously aware of the ongoing adjustments.

Figure 1:
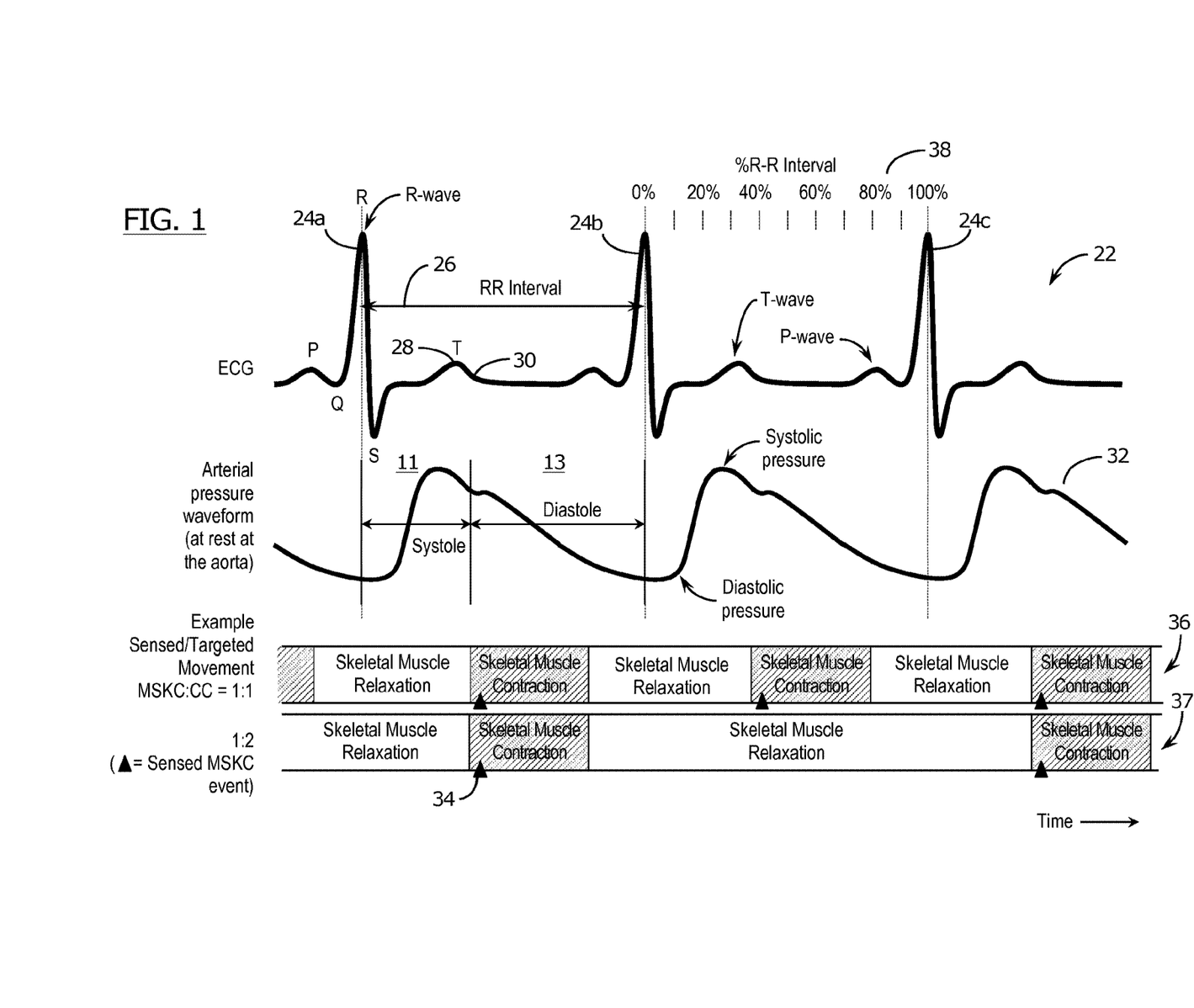
FIG. 1 is a graph illustrating example signals and timing relationships between an ECG tracing, central arterial pressure waveform, targeted skeletal muscle contraction cycles, and the timing of sensed MSKC events of a user.

FIG. 1 illustrates example signals and timing relationships between an ECG tracing 22, central arterial pressure waveform 32, targeted skeletal muscle contraction cycles 36 and 37, and the timing of sensed MSKC activity events 34 of a user. ECG tracing 22 depicts various different waves including P-waves, Q-waves, R-waves, S-waves, and T-waves.

R-waves 24 (including 24a, 24b, and 24c) represent depolarization of the myocardium of the ventricular walls of the heart. R-waves 24 can be utilized in the measurement of HR via the measurement of the duration of R-to-R intervals (RRI) 26. T-wave portion 28 reflects ventricular repolarization. T-wave end 30 can be used as a marker of the approximate timing of aortic valve closure, which marks the beginning of diastole, during the heart's pumping cycle. Each of these events reoccurs with every heartbeat.

Examples of targeted MSKC timing 36 and 37 both include periods of skeletal muscle contraction generally during early cardiac diastole 13, followed by periods of relaxation. Sensed MSKC events 34 correspond generally to the detected timing of the onset of activity-related maximal muscle contractions, which may also include inertial changes. In targeted MSKC timing 36, the muscle contractions corresponding to sensed events 34 repeat, in this example, with each instance of the CC. That is, MSKC:CC=1:1. In targeted MSKC timing 37, the sensed MSKC events 34 and targeted muscle contractions repeat with every other CC. That is MSKC:CC=1:2.

Scale 38 represents the percent of the RRI 26 nomenclature used herein (equivalently, % R-R or % RRI). For example, 0% and 100% represent events timed coincident with the R-waves 24, while 25% of the RRI is a quarter of the way between successive R-waves 24 (e.g., between 24b and 24c), and 50% is the mid-point between R-waves 24. Scale 38 can alternatively be expressed fractionally as a value from zero to one, or as a "phase" in units of degrees between zero and 360 degrees, or in radians between zero and $2\pi$ radians (e.g., 25%=0.25=90 degrees=1.57 radians), equivalent to the percentage terminology. Values greater than 100% describe events in a subsequent R-R interval (e.g., 130% represents a 30% location in the following interval). In yet another alternative, the relative sensed MSKC and CC timing relationship are expressed in terms of time, such as the milliseconds of difference between the occurrence of events 34 and 24 within an R-R interval. As can be understood from the descriptions above, expressions such as "relative MSKC and CC timing" and "relative MSKC and CC timing relationship" refer equivalently to the general phase relationship between the two pumping cycles.

Figure 2:
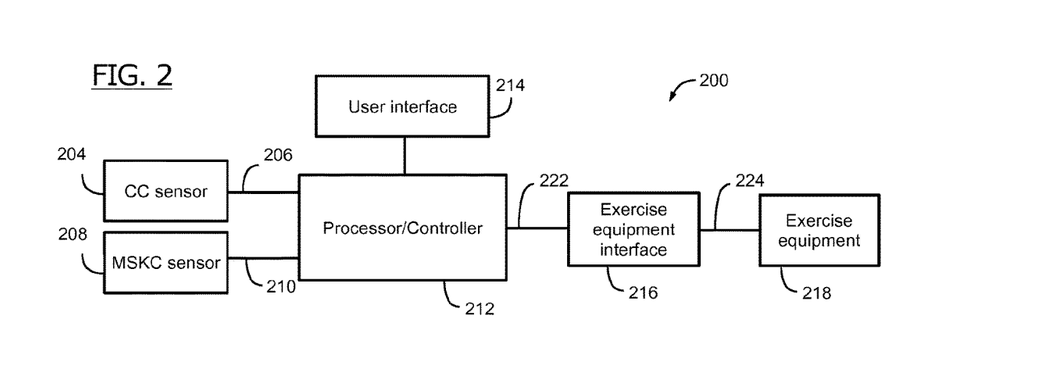
FIG. 2 is a block diagram of an exemplary system for controlling and adjusting automatically and in real-time the settings or behaviors of exercise equipment based on a user's sensed relative MSKC and CC timing.

FIG. 2 illustrates the basic components of a system 200 for use according to the methods described more fully below. Sensors 204 and 208 are responsive to the user's CC and MSKC, respectively, and provide their associated signals via connections 206 and 210 to a microprocessor and/or controller 212. User interface 214 allows the user to input to the system configurable run-time settings according to their preferences (e.g., selection of operating mode, target HR, HR alert zones, running display characteristics, enabling or disabling logging), as well as means to provide an output of visual, audible, and/or tactile information during their activity (e.g., whether step controlling is active or inactive, and indication of the user's HR, cadence, and/or relative MSKC-CC timing in real-time or as a trend display). Interface 214 may further include a link to another device such as a computer, smartphone, smart-watch, smart-glasses, exercise equipment interface, or other remote device; or through a dedicated interface to the current device such as a touch-screen, switches, etc.

The processor/controller 212 processes the signals from 204 and 208 to determine the relative MSKC to CC timing relationship of the user and determines its difference compared to a targeted relative timing value (these processes and targeted values will be described more fully below). The difference is then used to determine needed adjustments to the exercise equipment 218 to correct a sensed error relative to the targeted value. The processor/controller 212 is linked to the exercise equipment 218 through an exercise equipment interface 216 for transmitting and receiving the associated signals and/or commands needed to function according to the current methods. Any or all of the components indicated in FIG. 2 can be physically housed or incorporated by function into the exercise equipment, or alternatively included in one or more separate packaged device(s). Furthermore, any or all of the lines 206, 210, 220, 222 and 224 linking unique componentry can be accomplished through wired and/or wireless communications alone or in combination.

Figure 3:
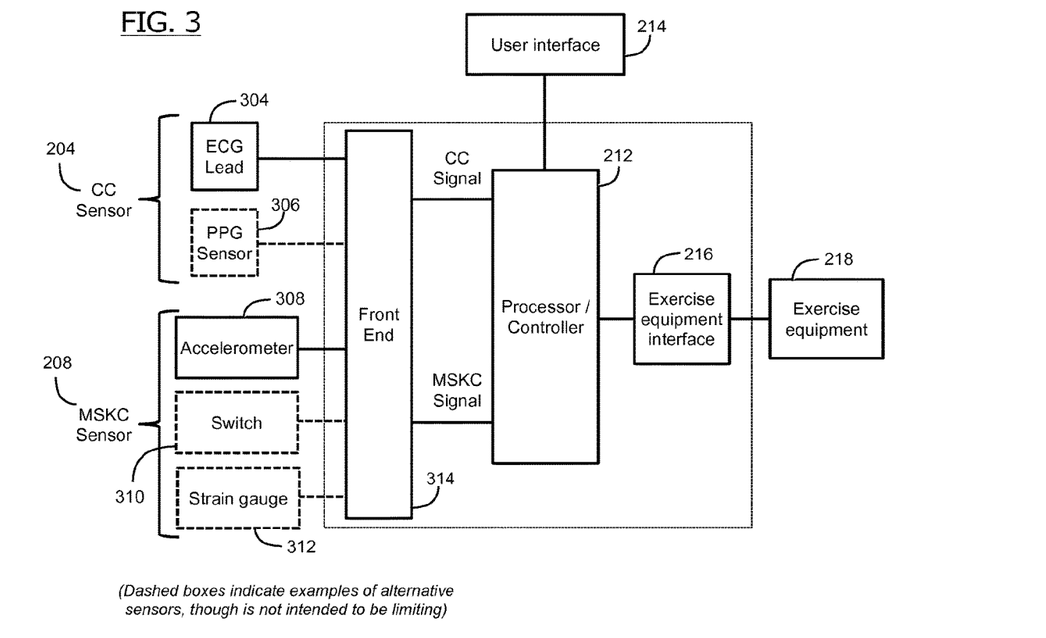
FIG. 3 is a block diagram of the system of FIG. 2 showing additional components.

FIG. 3 illustrates the system 200 of FIG. 2 in more detail. CC sensor 204, in one example, comprises an ECG lead 304 that includes at least two electrodes in electrical contact with the user. In another example, CC sensor 204 comprises a photoplethysmography (PPG) sensor 306 that includes a light source, such as an LED, and a photodetector, with one, both, or neither of the two components in contact with the user's skin at a blood perfused tissue location such as on the user's forehead, temple, ear, or other suitable PPG location. There are yet further alternative transducing methods available for CC sensor 204, including impedance plethysmography (IPG), infrared or visible light based video cameras that detect changes in the skin color or optical reflectance with each heartbeat, electronic auscultation using a microphone, auscultation, ultrasound, sonar, radar, or by detecting any other signal that correlates directly in real-time with the user's cardiac cycle. Any required transducer drive currents, voltages and signals, as well as conditioning and possibly digitizing of the received signals, may be provided by front end 314, which serves to provide an interface between sensors 204 and 208 and processor/controller 212.

MSKC sensor 208 in system 300, in one example, comprises an accelerometer 308 located on the user (on the chest, back, side, waist, head, arm, leg, etc.) such that changes in the monitored signals track with the user's repetitive movements; or on the exercise equipment, provided movements of the equipment relate specifically to the user's MSKC timing. Examples of such suitable equipment locations include the crank of a bicycle or foot platform of an elliptical exercise apparatus, as the acceleration of these locations cycle in synchrony with the user's repetitive movements. Further examples of MSKC sensor 208 options are shown in FIG. 3 as an optical or mechanical switch 310 or strain gauge 312 (configured for sensing changes in stress, force, or pressure). Any of these sensors 308, 310, or 312 would be appropriately mounted on exercise equipment 218 so as to change state or signal level in synchrony with each cycle of the user's repetitive movements. Yet further alternative signal transducers for sensing the MSKC timing include magnetometers, gyroscopes, proximity sensors, video cameras, or any other device that generates a signal with a direct correlation in real time to the user's MSKC. In general, sensors responsive to the user's CC cycle and/or MSKC activity may be directly attached to the user, attached to the exercise equipment, or mounted remote to the user and/or equipment.

In some implementations of systems 200 or 300, a single transducer may provide the functionality of both of the CC and MSKC activity sensors. For example, signals from a PPG sensor may be used by the system to identify characteristics associated with the relative MSKC and CC pump timing, such as by numerically characterizing the signal pulse amplitude or waveform morphology. In general, signals from any transducer responsive to peripheral intravascular blood volume, pressure or flow can be used to identify characteristics of the timing, relative timing and magnitude of both CC and MSKC blood pumps.

Because systems 200 and 300 shown in FIGS. 2 and 3 are used, in part, to determine the user's relative MSKC and CC timing relationship in an ongoing manner, it is important that the hardware timing relationship of the transmitted signals coming from two or more signal transducers are understood and/or controlled. For example, if the MSKC and CC signals are acquired based on the timing of different clocks, or if one or both signals are sent wirelessly to the processor controller, any drifting of the clocking signals or latency in the signal transmission may influence the sensed relative MSKC-to-CC timing relationship. Preferably, the sensed MSKC and CC event times are based on a common clocking signal, or alternatively, synchronized clocks so as to maintain a stable hardware influence on the sensed physiologic relationship.

Systems 200 and 300 include means for adjusting the settings or behaviors of exercise equipment 218 through interface 216. Such adjustments may include, for example, at least one of a change in: treadmill track speed, resistance, or incline; elliptical resistance, cadence, or stride length; bicycle resistance, gearing, or crank length; rowing resistance or stroke length. As can be appreciated, these examples target factors in the respective equipment's settings that can affect a user's activity cadence and/or HR. Furthermore, the adjustments can be made in a magnitude and/or duration sufficient to quickly correct sensed errors in the user's relative MSKC-CC timing with respect to a targeted timing relationship or, alternatively, small enough so as to be relatively imperceptible to the user. The electromechanical components used to induce changes to the exercise equipment may be additional components added specifically for the purpose of implementing system 200 or 300; or may already be included as part of the exercise equipment, with interface 216 used to communicate with the controllers of such components already in place.

Figure 4:
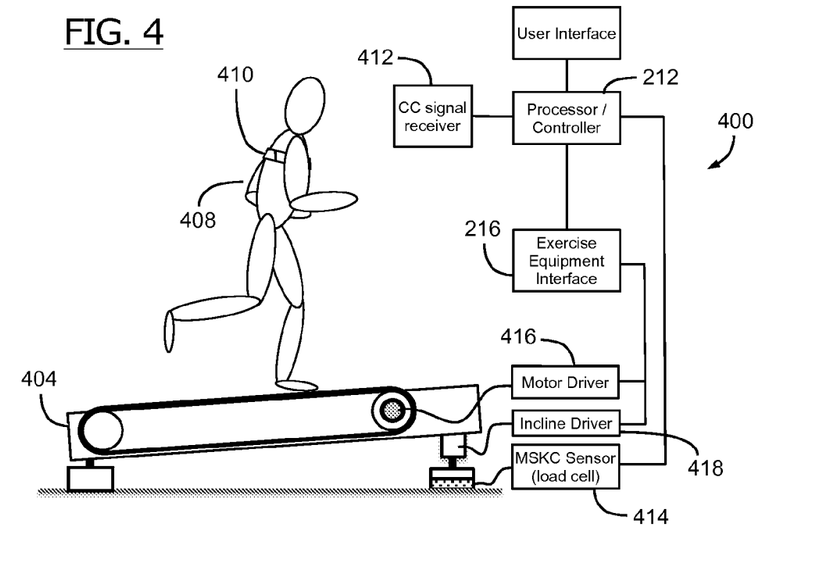
FIG. 4 shows an individual running on a treadmill with connections to an exemplary system.
Figure 5:
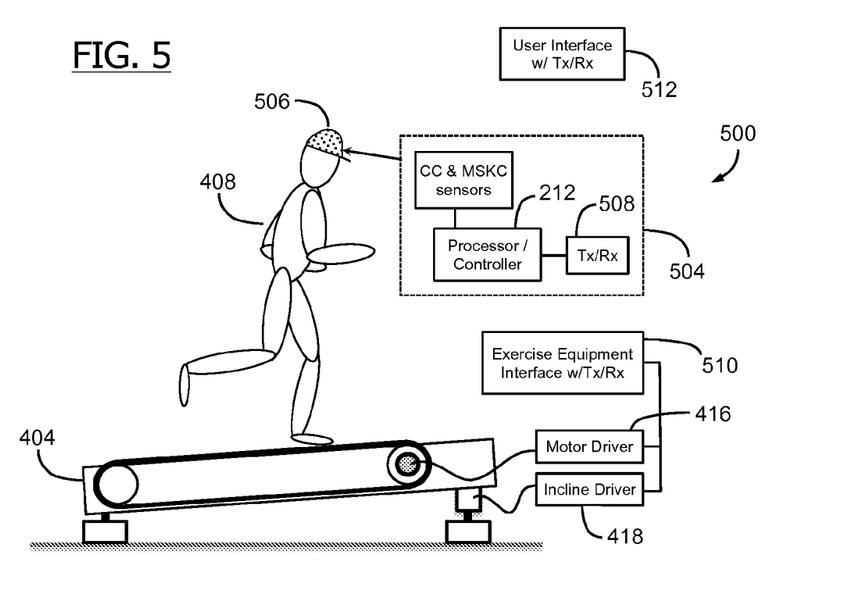
FIG. 5 shows an individual running on a treadmill as in FIG. 4 with alternative components of the exemplary system.

FIGS. 4 and 5 illustrate examples of system configurations applied to a treadmill 404. In the example system shown in FIG. 4, user 408 wears a chest strap 410 that includes a CC sensor comprising an ECG lead. The strap further includes electrical circuitry to transduce and condition the ECG signal and transmit the signal data wirelessly. One such chest strap assembly is available commercially from Zephyr Technology (Annapolis, Md., USA; Zephyr Bioharness 3), though other comparable devices may be used. The ECG signals from 410 are received by CC signal receiver 412 and processed by processor/controller 212 for determining the timing of the users CC. The MSKC timing in system 400 is sensed using signals from load cell 414 positioned beneath one or more of the feet of treadmill 404. The amount of force applied to load cell 414 varies over time in synchrony with each step of user 408 while they are running or walking. Processor/controller 212 processes the signals and identifies the timing of each step, in one example, by using the signal associated with the onset of increasing force or, in another example, as the point in time of maximal force during each stepping cycle. Processor/controller 212 determines the relative timing of CC and MSKC signals, its difference with respect to a targeted value, and determines any needed corrective actions to reduce the magnitude of the difference. These corrective actions are then implemented through exercise equipment interface 216 to change the speed of the treadmill through motor driver 416 and/or the incline of the treadmill through incline driver 418.

FIG. 5 provides another example of a system for use with a treadmill. In system 500 of FIG. 5, CC sensor 204, MSKC sensor 208, front end 314 and processor/controller 212 are all packaged in one or more housings 504 worn by user 408. As shown in system 500, these components are housed in a hat 506. In this example, CC sensor 204 comprises a PPG sensor (306) and may be located at user 408's forehead, temple, or on or in their ear; and MSKC sensor 208 comprises an accelerometer (308). Communications between processor/controller 212 and exercise equipment 218 is done wirelessly through transmitter/receiver (Tx/Rx) 508 and 510, respectively, as is communication with user interface 512. Interfaces 510 and 512 operate in a comparable manner as 216 and 214, respectively, though include provisions for the wireless communication.

Figure 6:
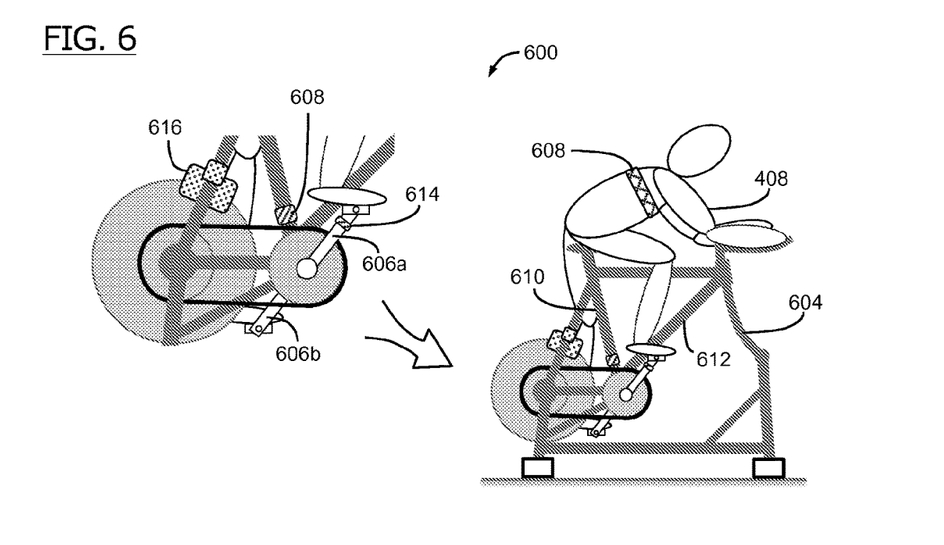
FIG. 6 shows an individual on an exercise bike with system components.

FIG. 6 illustrates the principal elements of an example system 600 for use with a stationary bicycle 604. User 408 wears a chest strap 608 that includes an ECG lead for sensing their CC timing, and a wireless transmitter and/or transmitter/receiver. The MSKC timing of user 408, associated with their pedaling in this example, is sensed when one or both cranks 606a and 606b passes a proximity sensor 608 mounted to the seat tube 610 or, alternatively, the down tube 612. Depending on the nature of proximity sensor 608 used, affiliated component(s) 614 may be attached to one or both cranks 606 (e.g., a magnet or optical reflector). An alternative example of MSKC sensor 208 comprises a 2- or 3-axis accelerometer mounted directly to the crank, with signals from one or both of the two axes in the plane of the crank used for identifying the crank location. In example system 600, the pedaling resistance is adjusted by an electronically controlled variable resistance brake 616, controlled by processor/controller 212 and exercise equipment interface 218, to alter the MSKC timing of user 408 as needed.

Figure 7:
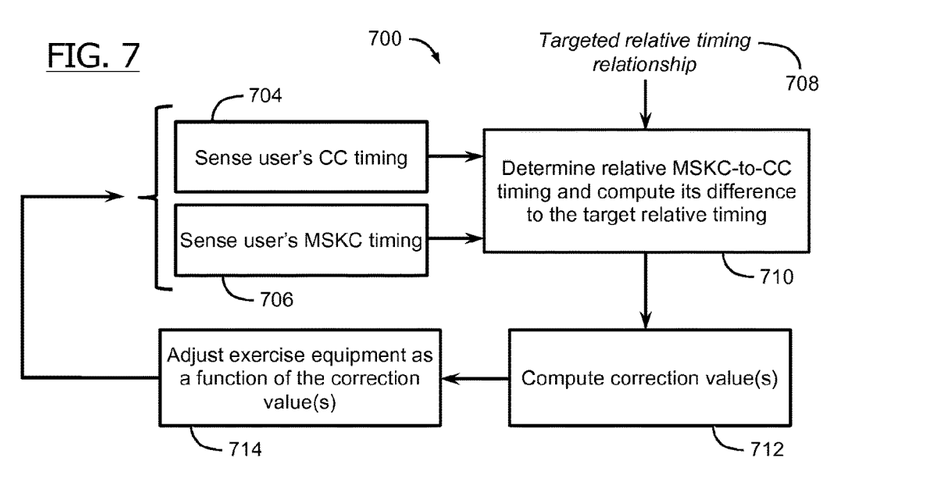
FIG. 7 is a flow chart showing exemplary closed loop control operation of the system.

A block diagram of the basic closed loop control system 700 according to the present disclosure is shown in FIG. 7. The process begins by sensing the user's respective CC 704 and MSKC timing 706. These repetitive time-dependent values are then used to determine the relative MSKC-CC timing relationship. In one example, the CC and MSKC event times 24 and 34 (shown in FIG. 1) coincide with one another (0% RRI); and in another example, the MSKC events 34 occur halfway between two consecutive CC events 24 (50% RRI). This sensed relative timing value is compared to a targeted relative timing relationship 708 (established outside of this loop) to compute a difference value 710. The difference value 710, which represents an "error" between the sensed timing relationship and the targeted timing relationship, is then used to determine a correction value 712 and an associated change to one or more settings or behaviors of the exercise equipment. This change in setting(s) will, in turn, affect the user's relative MSKC-CC timing and, accordingly, have an effect to reduce the magnitude of the error (decrease the absolute difference value). Once the correction is determined and implemented on the equipment 714, the process loops back to the beginning and repeats.

Figure 8:
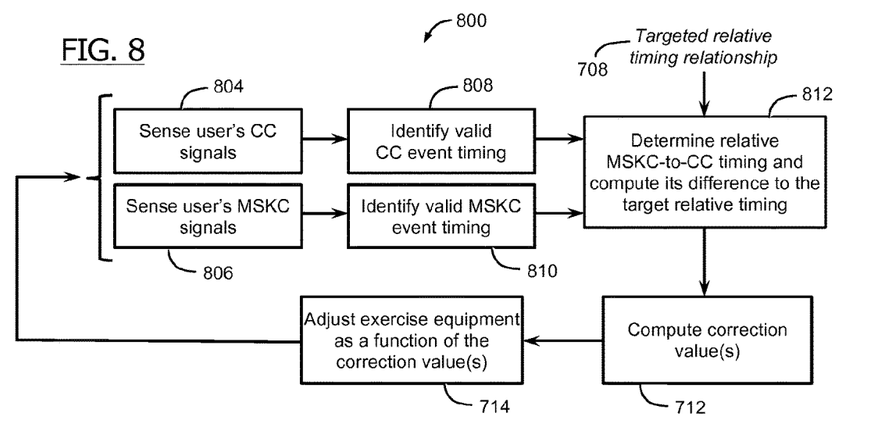
FIG. 8 is a flow chart showing exemplary operation of the system.

As shown in control loop 800 of FIG. 8, determining the relative MSKC-CC timing in 812 from the available CC and MSKC signals 804 and 806, respectively, may further include signal validation steps 808 and 810. Such validation is helpful in ensuring that the measured error values 812 and correction values in 712 used in making adjustments to the equipment 714 (if needed) are based on valid sensed readings and not false readings caused by signal noise or other artifacts. Examples of validating include accepting only signals that are within a specified range of the recent average magnitude, and/or event times that occur within a specified range of the recent average event-to-event times. Other signals may be rejected and not used in steps 812, 712, and 714, with the process continuing to loop without making adjustments to the exercise equipment until valid signals are again acquired.

Figure 9:
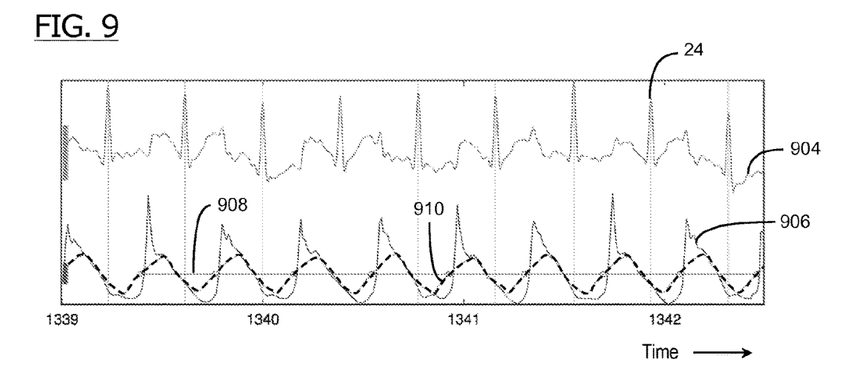
FIG. 9 is a chart illustrating ECG and vertical axis accelerometer signals obtained on a user wearing a monitor while exercising.

Methods used for detecting MSKC events 34 depend on the type of activity being conducted, the exercise equipment being used, and the type and location of the MSKC signal transducer. Similarly, methods used for detecting CC timing events, such as 24, depend on the nature of the signal transducer used. FIG. 9 illustrates ECG 904 and vertical axis accelerometer signals 906 obtained on a user wearing a chest strap-based monitor while running CC timing events 704 or 808 in this case can be determined by the system using the ECG signal 904 by identifying the timing of a feature within the signal, such as the distinctive R-waves 24 that occur once per cardiac cycle. Alternatively, the system can use a PPG signal acquired from a sensor located, for example, on an adequately blood perfused tissue. Though not shown here, the signal has an appearance generally similar to arterial pressure waveform 32; the CC timing can be identified by the system as the signal associated with the peak within each cycle, or the valley, or the peak of the first derivative (the steep rise in the signal between end of diastole and systole)—each representing features that occur at close to the same point in time within the user's CC, and repeat at the user's HR.

Returning to FIG. 9, MSKC events 34 can be defined as the points in time when the positive-sloped portion of vertical axis signal 906 crosses the signal's overall midpoint 908 (i.e., the value similarly observed when the user is standing still, which will represent approximately +1 g). The signal line 906 represents the raw accelerometer signal, while line 910 is a centered boxcar-filtered value, used to attenuate the higher-frequency components of the signal. Note that the points in time where 906 and 910 cross the midline 908 differ slightly. In another example for detecting MSKC events 34, a force transducer can be used and located on the base of the treadmill, such as load cell 414 in FIG. 4, with events 34 defined as the points when the force signal increases above a defined threshold or, in an alternative example, the points of local maxima in the signal. In another example, for exercise equipment that includes a reciprocating, oscillating or rotating element with a known and fixed relationship to the user's repetitive movements (e.g., a wheel, shaft, crank, or lever arm associated with a bicycle, stepper, elliptical, or rowing machine), a proximity sensor such as 608 as shown in FIG. 6, or accelerometer or other suitable transducer may be used to identify the cycle timing of the user's MSK repetitive movements. With each of these examples, specific features within the available signals occur once per MSKC, at close to the same point in time within each cycle and, accordingly, can be used to identify the blood pump timing of the repetitive MSKC. In some cases, depending on the design and type of equipment used, this sensed cycle timing may not occur with a 1:1 timing relationship to the user's MSKC, instead occurring with a 1:2 (every other MSKC), 2:1 (twice per MSKC), or other fixed relationship. This known relationship can be factored into the targeted relative MSKC-CC timing relationships described above.

The relative timing and/or phase of the MSKC and CC signals can be determined by the processor in algorithm step 710 (and comparable steps in the other examples provided in the current disclosure) using event-based computations or, alternatively, by evaluating a span of signals in their entirety without identifying specific features within them. For example, an event-based approach using an ECG signal 904 (equivalently, 22) for monitoring the user's CC timing 704 can be configured to identify the specific timing of successive R-waves 24 ($CC_t$, referring to a timing event within the CC), and an accelerometer signal for monitoring MSKC timing 706 can target the timing of local peaks or, alternatively, another selected recurrent component of the user's rhythmic musculoskeletal activity ($MSKC_t$). The instantaneous MSKC "phase", i.e., the timing location of the sensed $MSKC_t$ relative to the CC, can then be computed as $$MSK\phi = (MSKC_t - CC_{t-1})/(CC_t - CC_{t-1}),$$

where the subscripts t and t−1 refer to the associated times of the CC and MSKC events and previous event, respectively; and the MSKC event occurs within the considered R-R interval (i.e., $CC_{t-1} \leq MSKC_t < CC_t$). When MSKφ is calculated as shown, the resulting phase is presented as a fractional value of the RRI. The same values can be presented in alternative units of measure: multiplying the right hand side by 100 results in units of % RRI; multiplying by 360 provides the phase in degrees; and multiplying by $2\pi$ provides the phase in radians. The equivalent relative MSKC-CC timing information MSKφ determined in 710 can be computed alternatively using a span of CC 904 and MSKC 906 (or 908) signals in their entirety rather than by identifying specific $CC_t$ and $MSKC_t$ event times within the signal. For example, cross correlation methods can be utilized in comparing CC signals (ECG, PPG, etc.) and MSKC signals (accelerometer, load cell, crank location sensor, etc.) to determine the time lag or phase relationship between them in 710. In general, numerous computational methods may be used (e.g., in the time-domain, frequency-domain, or other suitable domain) without departing from the scope of the systems described in the current systems.

In one use example of treadmill system 400 or 500 as shown in FIGS. 4 and 5, and using control loop 700 or 800 as in FIGS. 7 and 8, according to the current descriptions, consider a runner 408 striding comfortably on a treadmill 404 at a cadence of 165 steps per minute (SPM), with the track speed set nominally to 7.5 miles per hour. This equates to a stride length of 4 feet per step. Consider that the settings of the machine (e.g., incline) have been adjusted so that the user's heart is beating at a closely matched rate, namely at a consistent 165 beats per minute (BPM), and the sensed relative MSKC-CC timing value based on the detection of their foot strikes differs from an exemplary target value 708 of 40% of the RRI. If the sensed step timing relationship is in the range of approximately >40% and <90% of the RRI (i.e., too late), then a slight increase in track speed 714 can be used to cause the user to step a little sooner if the stride length is maintained, reducing the difference between the sensed and targeted relative step timing 710/812. Conversely, if the sensed stepping is in the range of approximately <40% and >90% RRI (to early), then a slight slowing of the track speed 714 can be used to cause the user to step later and approach the target timing.

The respective increase or decrease in track speed 714 could be computed in 712 to correct the user's 408 entire step timing difference in one step cycle or over multiple step cycles. In continuing this same example, consider that the user's 408 sensed step timing relative to the target was 50% of the RRI, an error 710/812 of +10% RRI. At 165 SPM (an RRI of approximately 0.364 sec), this indicates that a step error of ~+0.036 sec needs to be eliminated. The treadmill 404 could be sped up in 714 by 10% for the duration of one step (i.e., 8.25 MPH for ~0.36 sec), or at a more subtle speed increase to, for example, 7.6 MPH for several seconds to correct for the user's 408 step timing error more slowly over multiple steps. Alternatively, the treadmill speed may be kept at a higher speed, e.g. 7.55 MPH for an even longer period. Over the longer interims, relative step timing information from subsequent steps and heartbeats becomes available and can be used to more incrementally update the speed and/or incline changes. Small speed changes of these latter magnitudes are generally imperceptible to the user.

In this example, the correction value 712 was proportional to the sensed "error" between the sensed and the target relative timing 710/812. The size of the adjustment, e.g., made over one or multiple steps, is defined by a scaling factor, or "gain", used to define the magnitude of the correction 712 each time it is implemented. Options for a more sophisticated control loop can compute the magnitude of the correction by further including terms related to the time integral of the error 710/812, and further optionally with terms related to the error's 710/812 time-rate-of-change (derivative). Such P-I-D (proportional-integral-derivative) control loops are well known in control systems, as are methods for tuning the proper balance of their respective gain factors (Kp, Ki, Kd) to create a responsive yet stable system. One or more of the K-factors can be zero.

Limits on the range of acceptable speeds and accelerations resulting from the adjustments made in 712 can be included, important from both a user comfort and a safety perspective. Furthermore, control 714 may optionally be effectively suspended if the sensed relative timing is within a predefined acceptable tolerance of the target 708 and/or, in another example, if the user's HR and MSKC cadence differ by more than a predefined amount.

While the treadmill track speed was adjusted to change step timing in this example, the incline could alternatively be varied to achieve the same goal, with the change in incline based on a suitably configured control loop. For example, the change in track speed described above to correct the user's relative step timing error 710/812 would be replaced by a change 714 in incline, affecting the user's stride length and step timing to reduce and ultimately correct the sensed error value. In another alternative, both track speed and incline can be adjusted in 714 based on the current and recent values of the sensed relative MSKC-CC timing, with changes in both directed to affecting the user's step timing to reduce the sensed error 710/812.

In yet another embodiment, adjustments in the treadmill 404 track speed 714 (such as those described above) may be accompanied by a simultaneous change in incline in an amount selected to keep work output substantially constant and thereby mitigate likely HR changes. For example, a decrease in track speed used to affect the user's step timing may be accompanied with a paired increase in incline, and visa versa, so as to help maintain a more stable HR. As an example, if the track speed is changed from 7.5 to 7.6 MPH to correct a sensed relative MSKC-CC timing error, the user's work output increases; slightly lowering the incline, e.g. from 2% to 1.8%, reduces the required work and will help maintain the user's work output and HR.

All of the examples described above were based on the use of a treadmill, however the same principles apply with other exercise equipment.

Figure 10:
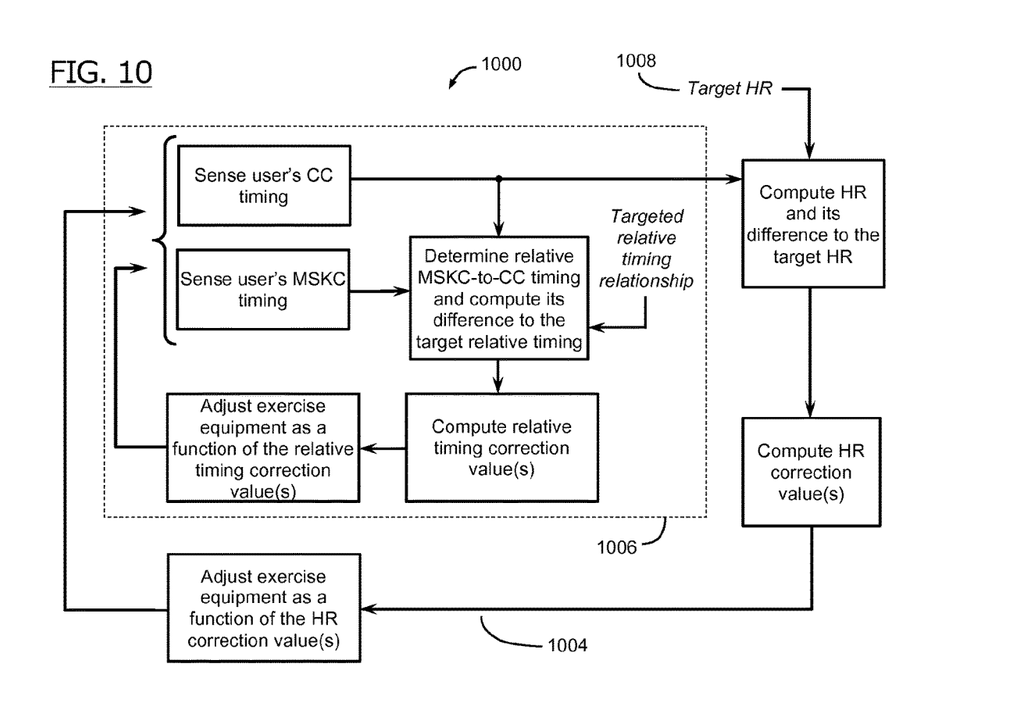
FIG. 10 is a flow chart showing exemplary operation of the system.

FIG. 10 illustrates control system 1000, another embodiment of the present disclosure in which an "outer" control loop 1004 is added to an "inner" control loop 1006. The inner loop 1006 operates as described above in relation to system 700 of FIG. 7, though system 800 of FIG. 8 could also be used in this context. The outer loop 1004 makes further adjustments to the exercise equipment so as to attain and/or maintain the user's HR near a target HR 1008. The response time of the outer "HR" control loop 1004 is generally configured to be slower than the inner "phase" control loop 1006, so as to reduce the likelihood of the two loops interfering with each other, as well as the fact that the user's average HR typically responds more slowly than can the timing of their MSKC and its cadence.

Variations of the control loops depicted by FIGS. 7, 8 and FIG. 10 can be used without disrupting the basic functionality of the system. For example, the looping can occur after the process step that computes the error term(s) 710 and 812, with the one or more correction values computed and implemented in parallel to, but outside of, the looping process. Furthermore, while HR is targeted in the outer loop 1004 of FIG. 10, other physiologic variables can be selected, or, in an alternative embodiment, adding further loops can be used to control multiple physiologic variables.

As an alternative to making adjustments to the overall track speed of a treadmill to affect the user's step timing, more sophisticated changes to the tracking can be used. For example, while the nominal speed may be generally maintained at, for example, 7.5 MPH as in the example scenario described above, the track speed can be changed non-uniformly, transiently, and timed to occur when the user's foot strikes the track either speeding up or slowing while the foot is in contact with the track. This "kick" or "drag" can have an effect of changing the user's cadence just slightly and in the proper direction, to have the desired effect in correcting the sensed timing error. In another example considering a rowing apparatus, the drag on the oar can initially be made to be higher or lower than under nominal conditions so as to impact the timing of the executed stroke. While the treadmill track speed and rowing resistance were used in these examples, the same principal can be used with other exercise equipment. In each case, the change to the exercise equipment setting or induced behavior is intended to cause a relatively small change in the user's MSKC timing to correct the sensed relative timing error with respect to the target, without greatly impacting the frequency and stroke of their activity (e.g., step rate and stride length while running, or stroke rate and length while rowing).

In an example exercise routine, prior to enabling the active control of the equipment, a user may warm-up until their HR approaches his or her natural cadence region. Several commercially available aerobic fitness machines incorporate standard approaches for assisting the user in achieving and maintaining a HR value within a target HR zone such as by adjusting the incline on a treadmill. The systems described in FIGS. 7/8 and by the inner loop 1004 of FIG. 10 are intended to operate when the user's MSKC repetition rate (cadence) and CC rate (HR) are similar, or alternatively have an approximately unitary fractional relationship (i.e., 1:2, 1:3, etc.).

When the sensed difference between their HR and this natural cadence (or integer multiple of the cadence) becomes sufficiently small in a predefined range, the system may optionally provide feedback prompts (audible, visual, tactile . . . ) to assist the user in finding an MSKC timing for their activity to be in proper coordination with their CC timing. If used, these prompts can then be discontinued once a period of time has elapsed or other defined condition is met (e.g., stable and small measured absolute phase-error). Once the user attains a sufficiently matched HR and MSKC cadence as described, the system's "fine-tuning" control of the equipment settings is enabled and the subsequent measured relative timing error values are used in a control loop (such as those shown in FIG. 2) and (3)) to make changes to the apparatus in an ongoing manner and/or as needed so as to maintain a proper MSKC-CC timing relationship.

If the systems described here sense that the user's HR exceeds the target HR 1008 by more than a predefined amount, the operation of the control loop(s) (e.g., inner loop 1006 and outer loop 1004 in FIG. 10 may be discontinued, and, in an example, the exercise equipment settings made to revert to a set of "safe" conditions (e.g., lower fixed speed and resistance) or, in another example, machine control made to revert to a more conventional approach already available in the equipment.

Alternative configurations of the systems described above may target a controlling measure other than the relative CC-MSKC timing. In one example, the targeted relationship may include a nonzero difference between the user's average HR and average MSKC cadence (e.g., target cadence=HR+2), with the control loop adjusting the equipment setting so as to generally maintain a cadence that differs from the user's HR by a targeted value. As the user's HR changes, the targeted MSKC cadence also changes, and the system makes adjustments to the exercise equipment accordingly. In such a configuration, the user's resulting relative MSKC-CC timing cycles through the full 0-100% % RRI span at a rate similar to difference between their HR and cadence.

In configurations where the target condition represents a specified relative MSKC-CC timing value, the target value need not be a single defined value used throughout an exercise period. For example, a particular activity may involve setting the target value to 45% RRI for certain period of time, e.g., 10 minutes, and then change to 65% RRI for the another period of time. Activity profiles may be defined according to a "script" of two or more settings comprising target values and durations, or a single setting used for the entire duration of the activity.

Depending on the activity involved, the type and design of equipment and the type and location of the signal transducer used as noted above, the sensed timing values may not represent the onset of skeletal muscle contraction as shown by 34 in FIG. 1, instead corresponding to a different portion of the MSK pump cycle. In a representative example, a sensor on a bicycle used for determining the timing of the rider's pedaling may identify when the crankshaft passes the seat tube in one implementation, or the down-tube in another implementation; consequently, the same relative MSKC-CC pump timing relationship is identified by two different sensed relative MSKC-CC event times. In cases in which the sensed MSKC event corresponds to a different portion of MSKC than is shown in sequence 36 or 37, the targeted relationship value should be adjusted accordingly or, alternatively, the MSKC times transformed to better associate with the general onset of maximal skeletal muscle contractions. In yet another alternative usage, the user's physiologic response to the sensed relative MSKC and CC timing signals is characterized empirically (calibrated), as described further below.

Similarly, the CC timing may depend on the type of signal transducer used and where on the body the signals are derived. For example, the readily-identified R-waves 24 of an ECG signal represent the electrical activity of the heart and occur earlier than the peak systolic arterial pressure seen in waveform 32 of FIG. 1. A PPG signal obtained peripherally will be delayed further, as it takes time for the pressure wave to propagate. There may be additional delays between the physiologic CC and MSKC events and when the system determines they occurred due to signal conditioning, transmission, and signal processing/filtering methods used.

Beyond these signal transducing and equipment influences to the sensed timings, the timing relationship of the actual onset of maximal MSK blood pumping from muscle contractions 34 with respect to the CC may depend on the nature of the activity and exercise equipment used. For example, the user's MSK blood-pumping characteristics resulting while running on a treadmill may differ from rowing or bicycling because of the different muscle groups involved, differing inertial effects, and/or other factors. In addition, MSK blood pumping can come in series or in parallel from multiple parts of the body, depending again on the nature of the activity and exercise equipment. For example, during bicycling, a user may push down with one leg, pull up with the other leg, and pull on the handlebars with one or both arms, each with similar or different MSKC timing relative to the CC timing.

The targeted relative timing relationship value 708 (or target timing within the RR interval) shown in FIGS. 7 and 8 can be selected based on the general population response for a particular type of activity and/or exercise equipment, or determined empirically to optimize one or more selected physiologic parameters of the user during their use of the exercise equipment. Determining an optimal or preferred timing relationship can be quite useful to help accommodate variations from all of the timing influences noted above, as the overall system—including the user's physiology and activity—is considered as a whole.

Such empirical "calibration" includes exposing the user to a variety of relative MSKC-CC timing relationships during their activity to find the values associated with a general physiologic economy, such as a reduced heart rate while moving at a generally fixed speed and resistance (work output). In an exemplary calibration mode, the system varies the targeted relative MSKC-CC timing relationship (e.g., as shown in FIG. 7 or 8) over time to expose the user to a number (at least two) of different relative timings at an otherwise stable work output level, and then identifies the "optimum" relative timing based on their measured physiologic responses (which includes any activity-dependent and equipment-dependent factors described above). Example physiologic measures include, but are not limited to the user's: HR, systolic and/or diastolic blood pressure, cardiac output, cardiac perfusion, muscle perfusion, muscle pH, cerebral perfusion, EEG activity, respiratory gases (e.g., $VO_2$, $VCO_2$, RER), and lactate levels. In each case, the optimum relative MSKC-CC timing relates to a desired condition, generally associated with a relatively improved physiologic economy, as reflected by an appropriate minimum or maximum of the respective measure of interest.

In more sophisticated systems, more than one MSKC sensor can be used simultaneously for sensing the timing of different muscle groups involved during the exercise activity, along with their timing relationship to one another and to the CC. These multiple signals and sensed timing events offer more information about the user's overall MSK blood pumping and can be used by the system to adjust multiple components of the exercise equipment to "fine tune" the timing of the user's various muscle groups.

In alternative embodiments comprising the concepts presented here, the equipment settings are adjusted by the system only if the user's relative CC-MSKC timing is sensed to occur generally and/or persistently at an unfavorable value, such as one associated with iMCP. In another example, this behavior operates in parallel with other control mechanisms of the exercise equipment that are being used, such as any one of methods described above, but takes over control if the user's relative timing is sensed to be unfavorable beyond a predefined value (e.g., generally exhibiting an unfavorable relative timing relationship for a duration that exceeds a predefined limit). Such background monitoring and intervention configurations may be considered as "watchdog modes," only making needed adjustments to the exercise equipment when certain undesirable behaviors are detected. Examples of adjustments to the exercise equipment include increases or decreases in: the track speed and/or incline of a treadmill; the gearing or, equivalently, resistance of a bicycle; the resistance and/or allowed stroke length of a rowing machine; or any setting of the equipment that results in a change in MSKC event and/or CC timing that does not maintain the existing sensed relative timing relationship.

Figure 11:
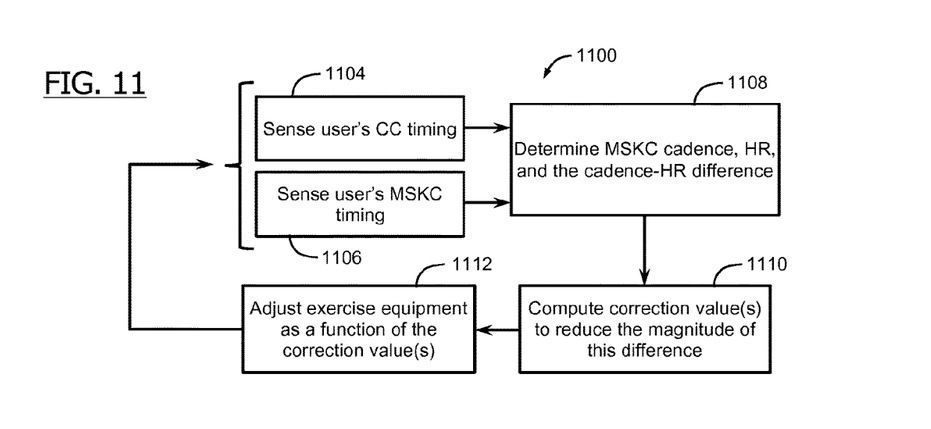
FIG. 11 is a flow chart that illustrates an example control loop used by the system to adjust the incline of a treadmill to a value that causes a user's heart rate to settle near their sensed MSKC rate.

In another example embodiment, the user exercises at a comfortable MSKC cadence; the system senses their HR and then makes adjustments to the equipment to cause their HR to approach the sensed value of their MSKC cadence. This allows the user's natural tendencies to optimally align their respective CC and MSKC timing (cardio-locomotor synchronization). As an example of this embodiment, the system sets the treadmill to a track speed that results in the user stepping at or close to 160 steps/min, a value that may be pre-set by the user. Alternatively, the user can adjust the track speed to find a natural and/or comfortable cadence; in yet another alternative, one that paces the user at a tempo of music they like to exercise to. FIG. 11 illustrates an example control loop 1100 used by system 200 to adjust the incline to a value that causes the user's heart rate to settle near their sensed MSKC rate, in the first case near 160 beats/min, or in the alternative example—at the sensed rate the user found to be their desired cadence. The user's sensed CC 1104 and MSKC 1106 timings are used in 1108 to determine the MSKC cadence (step rate), HR, and the cadence-HR difference. If the sensed HR differs from this sensed step rate, process step 1110 computes a correction value to the incline, up or down accordingly, so as to reduce this difference. The system then implements this correction value on the exercise equipment in 1112 and the control loop repeats. Increasing the incline causes the user's HR to increase as their workload is increased, and conversely decreasing incline reduces workload and HR. Optionally, if the user's natural relative MSKC-CC timing as sensed by the system differs from a targeted value 708 by a predefined amount and/or duration, the exercise equipment may then be further adjusted automatically to reduce the relative timing error according to the embodiments described above.

In yet another example embodiment, the user may select to control a portion of the available settings of the exercise apparatus manually, while allowing the remaining portion to be controlled by any of the systems described above for maintaining their relative MSKC and CC cycle timing. For example, the user may choose to manually control one or more of the speed, work output, cadence, resistance, stride length, incline, or other available settings of the exercise equipment, selecting a level or range according to their preference, while the remaining adjustable behaviors are controlled by the automated algorithms in response to the sensed MSKC and CC signals.

In further embodiments, audible prompting can be provided to assist the user in maintaining a target cadence. For example, a song's beat, or a metronome set at a substantially fixed prompt rate, can be provided at a target rhythm, with the exercise machine's adjustments used by the system to automatically bring the user's sensed HR to the substantially fixed prompt rate. Optionally, the exercise equipment may then be further adjusted by the system to coordinate the user's MSKC and CC cycle timing according to the embodiments described above.

Applicable to each of the example embodiments described, and as noted in some of the examples, the system can be designed to identify when the user's HR and activity cadence differ by close to an integer multiple (i.e., MSKC:CC=1:N, where N=1, 2, 3, ... ). Under these conditions, the system can make proper adjustments to the exercise equipment to control the user's MSKC timing with respect to their CC cycle while maintaining an MSKC cadence that corresponds to the same multiple. For example, foot strikes during walking can occur every other heart beat (targeted timing 37 in FIG. 1), as can strokes during rowing every 2 (or another multiple number) heartbeats.

In embodiments of the method and systems, during instances when MCP is not adequately achieved using automated real-time adjustments in the exercise equipment's settings, the user can be additionally or alternatively provided with an auditory, visual or tactile prompt to alter their MSKC. For example, a user may be prompted to move with rhythmic timing directed by an audible prompt. Alternatively, a user may be directed to increase or decrease stride length in response to instruction or prompting. In alternative embodiments, these prompts may be provided in the context of a game interface.

While the invention has been described with respect to the figures, it will be appreciated that many modifications and changes may be made by those skilled in the art without departing from the spirit of the invention. Any variation or derivation from the above description and drawings are included in the scope of the present invention as defined by the claims.

What is claimed is:

1. A method for synchronizing a rhythmic musculoskeletal activity cycle ("MSKC") of a user exercising on an exercise apparatus with a rhythmic cardiac cycle ("CC") of the user, the method comprising:
a first loop figured to repetitively:
detect a first signal feature representative of a CC timing of the user using a first detector, the first signal feature repeating at a heart rate of the user,
detect a second signal feature representative of an MSKC timing of the user using a second detector, the second signal feature repeating at a cadence of the user,
determine an actual timing relationship between the CC timing or first signal feature and the MSKC timing or second signal feature using a controller integrated into or coupled to the exercise apparatus,
determine a difference value between the actual timing relationship and a target timing relationship using the controller,
compute a relative timing correction value, and
adjust operations of the exercise apparatus as a function of the relative timing correction value and in response to a signal from the controller, wherein the operations of the exercise apparatus are adjusted to alter the MSKC timing of the user such that the magnitude of the difference value is reduced, and wherein adjusting the operations comprises adjusting a plurality of settings; and
a second loop configured to repetitively:
compute an actual heart rate of the user based on the CC timing or the first signal feature,
determine a second difference value between the actual heart rate and a target heart rate of the user,
compute a heart rate correction value, and
adjust operations of the exercise apparatus as a function of the heart rate correction value and in response to a second signal from the controller, wherein the operations of the exercise apparatus are adjusted to alter the actual heart rate of the user such that the magnitude of the second difference value is reduced, and wherein adjusting the operations comprises adjusting the plurality of settings,
wherein a response time of the second loop is configured to be greater than the first loop such that a likelihood of interference between the first loop and the second loop is reduced.

2. The method of claim 1, wherein the exercise apparatus is a treadmill and adjusting the plurality of settings comprises adjusting both a speed and an incline of the treadmill.

3. The method of claim 1 wherein adjusting the plurality of settings comprises more than one of: (a) a change in speed; (b) a change in resistance; (c) a change in incline; (d) a change in stride length; (e) a change in stroke length; (f) a change in crank length; (g) a change in frequency of a repetitive motion; and (h) a change in gearing.

4. The method of claim 1, further comprising receiving an input from the user via the controller and providing an output to the user via the controller.

5. The method of claim 1, further comprising identifying, with the controller, the target timing relationship.

6. The method of claim 5, wherein identifying the target timing relationship comprises performing an empirical calibration for a particular user, the empirical calibration comprising: exposing the user to at least two different CC to MSKC timing relationships; using signals from a detector and a processor to measure a physiologic response in the user exposed to the at least two different timing relationships; and using the controller to select the target timing relationship based on the physiologic response.

7. The method of claim 1, further comprising determining an adjustment value at preselected intervals, wherein the exercise apparatus adjusts operations based on the adjustment value received at each interval.

8. The method of claim 1, wherein the plurality of settings are adjusted to maintain a target value or range of values for at least one of a heart rate and a work output of the user.

9. A system that synchronizes a rhythmic musculoskeletal activity cycle ("MSKC") of a user exercising on an exercise apparatus with a rhythmic cardiac cycle ("CC") of the user, the system comprising:
a first detector for detecting a first signal feature representative of a CC timing of the user, the first signal feature repeating at a heart rate of the user;

a second detector for detecting a second signal feature representative of an MSKC timing of the user, the second signal feature repeating at a cadence of the user; and a controller integrated into or coupled to the exercise apparatus, the controller comprising a processor configured to:

perform a first loop repetitively, comprising:
- determine an actual timing relationship between the CC timing or first signal feature and the MSKC timing or second signal feature, and
- determine a difference value between the actual timing relationship and a target timing relationship,
- wherein the controller is configured to adjust operations of the exercise apparatus to alter the MSKC timing of the user to reduce the magnitude of the difference value, wherein adjusting operations comprises adjusting a plurality of settings; and perform a second loop repetitively, comprising:
- determine an actual heart rate of the user based on the CC timing or the first signal feature, and
- determine a second difference value between the actual heart rate and a target heart rate of the user,
- wherein the controller is further configured to adjust operations of the exercise apparatus to alter the actual heart rate of the user to reduce the magnitude of the second difference value, wherein adjusting operations comprises adjusting a plurality of settings,
- wherein a response time of the second loop is configured to be greater than the first loop such that a likelihood of interference between the first loop and the second loop is reduced.

10. The system of claim 9, wherein the controller is configured to continually receive CC timing data from the first detector and MSKC timing data from the second detector, and in response to the CC timing data and the MSKC timing data, the controller is configured to determine the difference value, determine an adjustment value, and transmit the adjustment value to the exercise apparatus at preselected intervals to continually and in real-time cause the exercise apparatus to adjust operations based on the adjustment value received at each interval.

11. The system of claim 9, wherein the exercise apparatus is selected from a group consisting of: (a) a treadmill; (b) an elliptical machine; (c) a stationary bike; (d) a stair-stepper; (e) a rowing machine; (f) a ski machine; (g) weight or other resistance-based strength trainer; (h) a bicycle; and (i) a device for assisting with ambulation.

12. The system of claim 9, wherein adjusting the plurality of settings comprises more than one of: (a) a change in speed; (b) a change in resistance; (c) a change in incline; (d) a change in stride length; (e) a change in stroke length; (f) a change in crank length; (g) a change in frequency of a repetitive motion; and (h) a change in gearing.

13. The system of claim 9, wherein the controller includes a user interface through which the user provides input to the controller and receives output from the controller.

14. The system of claim 9, wherein the first detector is selected from a group consisting of: (a) an ECG lead; (b) a photoplethysmography sensor, (c) an impedance plethysmography sensor (d) a video camera; (e) a microphone; and (f) an ultrasound transducer.

15. The system of claim 9, wherein the second detector is selected from a group consisting of: (a) accelerometer; (b) switch; (c) strain gauge; (d) a gyroscope; (e) a video camera; and (f) a proximity sensor.

16. The system of claim 9, wherein the controller is further configured to identify the target timing relationship, and wherein the target timing relationship is set by the controller based on an empirical calibration.

17. The system of claim 16, wherein the empirical calibration comprises: exposing the user to at least two distinct CC to MSKC timing relationships; using signals from a detector to measure a physiologic response in the user exposed to the at least two distinct CC to MSKC timing relationships; and using the controller to select the target timing relationship based on the physiologic response.

18. The system of claim 9, wherein the exercise apparatus is configured to receive the difference value from the controller and adjust operations to alter the MSKC timing of the user in response to the difference value.

19. The system of claim 9, wherein the exercise apparatus is a treadmill and adjusting a plurality of settings comprises adjusting a speed and an incline of the treadmill.

20. The system of claim 9, wherein the plurality of settings are adjusted to maintain a target value or range of values for at least one of a heart rate and a work output of the user.

* * * * *